W. B. FLANDERS.
LOW PRESSURE TURBINE.
APPLICATION FILED DEC. 20, 1915.
Reissued Feb. 15, 1916.
14,066.
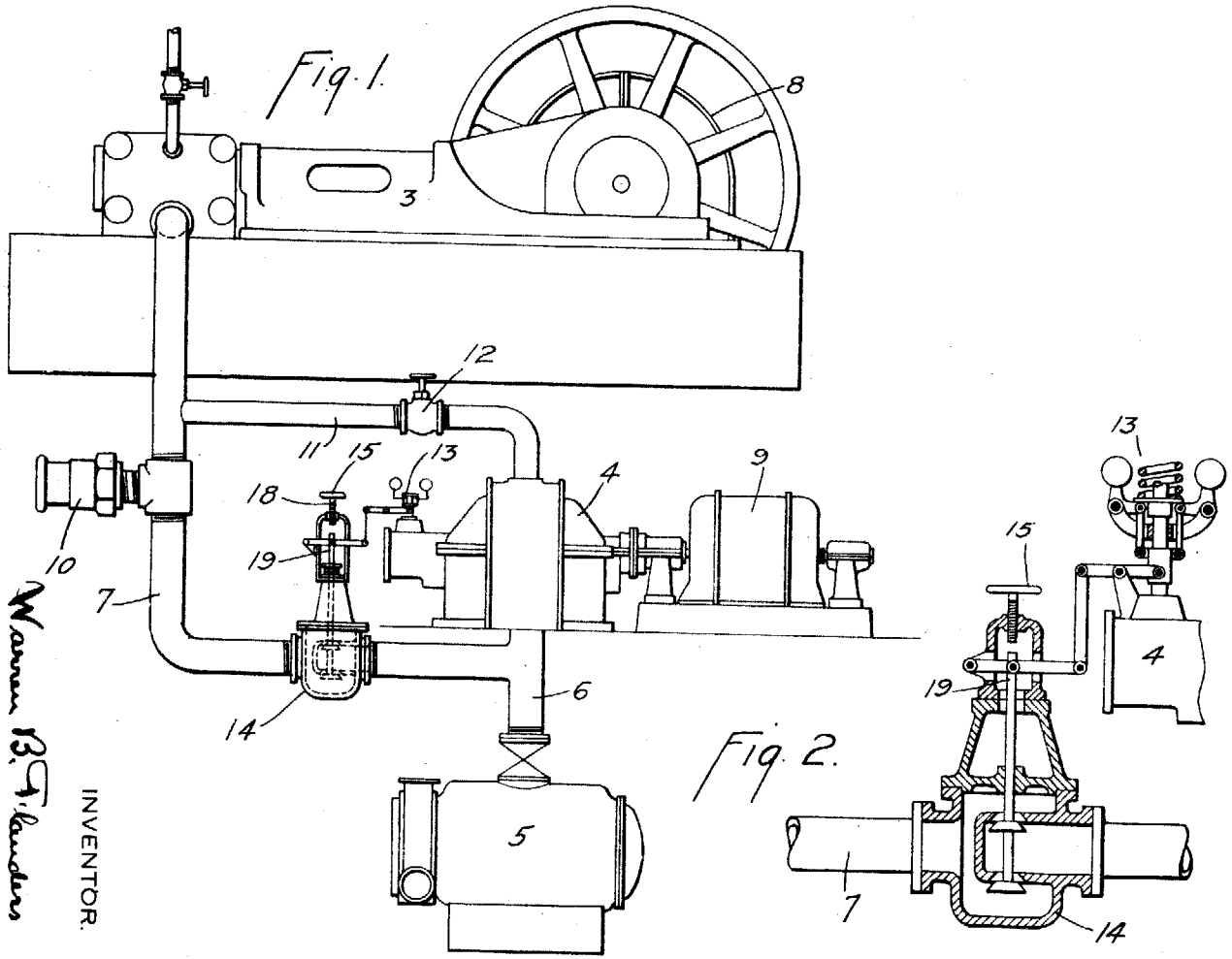
INVENTOR.
Warren B. Flanders
BY
HIS ATTORNEY IN FACT.

UNITED STATES PATENT OFFICE.

WARREN B. FLANDERS, OF HABANA, CUBA, ASSIGNOR, BY MESNE ASSIGNMENTS, TO THE COLONIAL TRUST COMPANY, TRUSTEE, OF PITTSBURGH, PENNSYLVANIA, A CORPORATION OF PENNSYLVANIA.

LOW-PRESSURE TURBINE.

14,066. Specification of Reissued Letters Patent. Reissued Feb. 15, 1916.

Original No. 1,158,999, dated November 2, 1915, Serial No. 472,230. Application for reissue filed December 20, 1915. Serial No. 67,902.

*To all whom it may concern:*

Be it known that I, WARREN B. FLANDERS, a resident of Habana, Cuba, have invented certain new and useful Improvements in Low-Pressure Turbines, of which the following is a specification.

This invention relates to means for controlling the disposition of motive fluid in organized apparatus consisting of high and low-pressure engines operating in series on all or a part of the motive fluid supply but which operate under separate and independently variable loads.

Turbines known as low-pressure turbines are frequently used in conjunction with reciprocating engines where the power from each is used for different purposes and where the load of one is independent of the other. For example, a reciprocating engine might be driving a mill or shafting of any kind and the low pressure turbine used for driving a dynamo, or the reciprocating engine used for driving a direct current dynamo for one purpose and the low-pressure turbine an alternator for another purpose or vice versa. In such applications it often happens that the load on the low-pressure turbine becomes light while the load on the reciprocating engine remains heavy; in such a case there is an excess of exhaust steam, that is, more than necessary for the low-pressure turbine. In cases like this, it has been customary to allow the excess exhaust steam discharging from the reciprocating engine to pass to the atmosphere by means of an escape valve. With such an arrangement, the reciprocating or high-pressure engine does not obtain the advantages of as complete an expansion of the steam as is available and consequently the efficiency of the organized apparatus drops off rapidly as the load on the low-pressure turbine decreases. This condition is, of course, aggravated when the reciprocating engine is operated under heavy loads and the low-pressure turbine under light or no load.

An object of this invention is to increase the efficiency in operation of such apparatus and to provide means whereby to a great extent the full expansive force of the steam is utilized regardless of the load variations on either the high or low-pressure engine.

In carrying out this invention, I employ in combination with a high-pressure engine, which may be a reciprocating engine or a turbine, a low-pressure engine, which is preferably a turbine, connected in series with a source of supply of steam or other motive fluid and means for automatically by-passing the excess motive fluid around the low-pressure engine to a condenser when the load on the low-pressure engine is such as not to require all of the motive fluid discharged from the high-pressure engine. In other words, I employ means for by-passing steam exhausted from the high-pressure engine around the low-pressure engine when such steam is in excess of that demanded by the low-pressure engine, and I deliver this excess steam directly to the condenser in such manner and quantity as to maintain the pressure in the exhaust of the reciprocating engine at as low a point as is necessary to operate the low-pressure turbine at its load. This arrangement reduces the consumption of motive fluid by the high-pressure engine considerably below what it would be if the excess steam or motive fluid were discharged into the atmosphere or against a fixed back-pressure and it increases the available energy of the organized apparatus.

In the drawings accompanying this application and forming a part thereof: Figure 1 is a more or less diagrammatic arrangement of a high pressure engine, low-pressure turbine, a condenser and controlling valve arranged to carry out my invention; and, Fig. 2 is a sectional elevation of the controlling valve utilized in the organized apparatus, and is shown in conjunction with the turbine governor.

The organized apparatus or system preferably comprises a reciprocating engine 3, a turbine 4 designed to operate on the exhaust steam from said engine, a condenser system 5 connected to the exhaust of the turbine by suitable piping 6 and to the exhaust of the engine by piping 7. The engine is shown as driving a generator 8 while the turbine drives a generator 9. The line 7 connecting the exhaust of the engine with the condenser is provided with an atmospheric relief valve 10 of any suitable design to prevent excessive pressure in the exhaust system in case of emergency, and the inlet to the turbine connects with the line 7 and therefore with the exhaust from the engine by a pipe 11; which pipe is provided with an ordinary throttle valve 12.

A speed-responsive device 13, which is shown in the form of an ordinary fly-ball governor, is operatively connected to the shaft of the turbine and is utilized for controlling the steam supplied to the turbine in accordance with its load demands.

A valve 14, which, if desired, may be of the double-heat-puppet type as illustrated, is located in the line 7 between the exhaust of the engine and the condenser and through suitable linkage is coupled up to the turbine speed-responsive device. The valve controls the effective area between the engine and the condenser and the linkage between it and the speed-responsive device is such that when the fly-balls of the device move inwardly (upon the slowing down in the speed of the turbine) the valve will close more or less to restrict the effective area of the line between the engine and the condenser. After this happens, that is, after the line is restricted, the path of least resistance for the steam exhausted from the engine becomes the passage through line 11 and the turbine to the condenser.

A hand wheel 15 is provided whereby the valve 14 may be manually opened irrespective of the position of the balls of the speed-responsive device. The hand wheel is attached to a screw 18 which lies in the path of the stem 19 of the valve. As the hand wheel is turned down, the screw 18 will abut against the end of the valve stem and move the valve more or less.

In the operation of the organized apparatus or system assuming that the engine 3 is running and exhausting either through the atmospheric relief valve or to the condenser, (the valve 14 having been previously opened manually by means of hand wheel 15) in order to start up the turbine, throttle valve 12 will be opened and the hand wheel slacked to allow the valve 14 to be moved by the speed-responsive device 13.

It will be understood, of course, that the line 7, which is shown as connecting with the engine exhaust, may be supplied with steam exhausted from a number of engines or turbines or from a collection of separately operated steam units, such as pumps or compressors. The turbine may be of any desired type and the condenser may be either of the jet or surface type. The drawings merely schematically represent my invention.

It may also be desirable to utilize this invention, for instance, in a plant where two kinds of power are required; that is, where one engine is utilized for the direct driving of machinery and the other for the driving of a generator. In this same plant steam of relatively high pressure might be required for some industrial purpose at, say, fifty pounds pressure and, furthermore, steam at 212 degrees might be required for some other purpose. In a case such as this, it would be desirable to employ a high-pressure engine or turbine expanding from the relatively high boiler pressure to, say, the pressure of fifty pounds and then employ a low-pressure engine or turbine expanding the steam from the pressure of fifty pounds to atmospheric pressure. The exhaust pipe from the low-pressure engine or turbine could then discharge into the heaters or other apparatus utilizing the steam at 212 degrees.

In accordance with the provisions of the patent statutes, I have described the principle of operation of my invention, together with the apparatus, which I now consider to represent the best embodiment thereof, but I desire to have it understood that the apparatus shown is only illustrative and that the invention can be carried out by other means.

What I claim is:

1. In combination with a turbine, a supply passage for delivering motive fluid to the turbine, a condenser, a by-pass communicating directly with said supply passage and said condenser, a single valve for controlling the operation of the turbine located in said by-pass, and a governor responsive in operation to the speed variations of said turbine for controlling the operation of said valve.

2. In combination with a high pressure engine, a low pressure engine, a passage for delivering motive fluid exhausted from the high pressure engine to the low pressure engine in open communication with the exhaust port of the high pressure engine and the inlet port of the low pressure engine, a condenser, a by-pass in direct communication with the exhaust port of the high pressure engine and with the inlet of the condenser and a single means for controlling said low pressure engine comprising a valve located in said by-pass, and a governor actuated by the low pressure engine for controlling the operation of said valve.

3. In combination with a high pressure engine, a low pressure engine, a passage in open communication with the exhaust port of said high pressure engine and the inlet port of the low pressure engine for delivering fluid exhausted from the high pressure engine to the low pressure engine, a condenser into which said low pressure engine discharges, a by-pass in open communication with the exhaust port of the high pressure engine and with the inlet of the condenser, and a single valve for controlling the operation of the low pressure engine located in said by-pass, and a governor for the low pressure engine controlling said valve.

4. In combination, a high pressure engine, a low pressure turbine, receiving fluid exhausted from the engine, a condenser in open communication with the turbine, a branched passage in open communication with the exhaust port of the engine, the inlet port of the turbine and the inlet of the condenser, and a single control valve for the turbine located in said passage, between the exhaust port of the engine and the inlet of the condenser, and means responsive to variations in the load on the turbine for controlling the valve.

5. In combination, an engine, a turbine receiving fluid exhausted from said engine, a condenser in communication with the exhaust ports of both the engine and the turbine, a passage in open communication with the exhaust port of the engine and the inlet port of the turbine, a single valve for controlling the operation of the turbine, located between the exhaust port of the engine and the inlet to the condenser, and a governor for the turbine for controlling the operation of said valve.

In testimony whereof, I have hereunto subscribed my name this eleventh day of December, 1915.

WARREN B. FLANDERS.

Corrections in Reissue Letters Patent No. 14,066.

It is hereby certified that in Reissue Letters Patent No. 14,066, granted February 15, 1916, upon the application of Warren B. Flanders, for an improvement in "Low-Pressure Turbines," errors appear in the printed specification requiring correction as follows: In the grant, the heading, and line 3, page 1, of the printed specification, the residence of the patentee was erroneously written and printed as "Habana, Cuba," whereas said residence should have been written and printed *Havana, Cuba;* page 2, line 13, for the compound word "double-heat-puppet" read *double-beat-poppet;* and that the said Letters Patent should be read with these corrections therein that the same may conform to the record of the case in the Patent Office.

Signed and sealed this 14th day of March, A. D., 1916.

[SEAL.]

J. T. NEWTON,
*Acting Commissioner of Patents.*

Cl. 121—118.